Jan. 19, 1954      M. J. HILER      2,666,329
THERMOMETER ASSEMBLY WITH LIMITED LUMINOUS BACKGROUND
Filed May 4, 1950
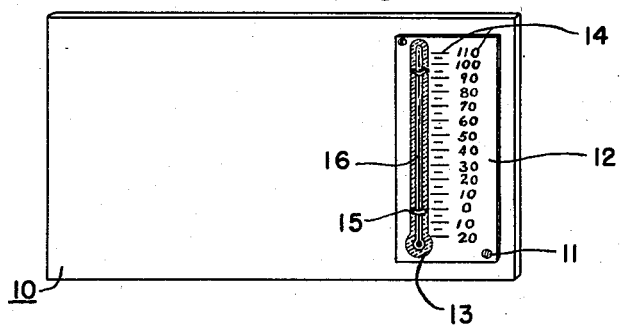
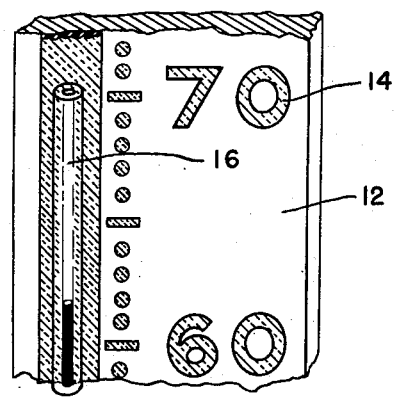
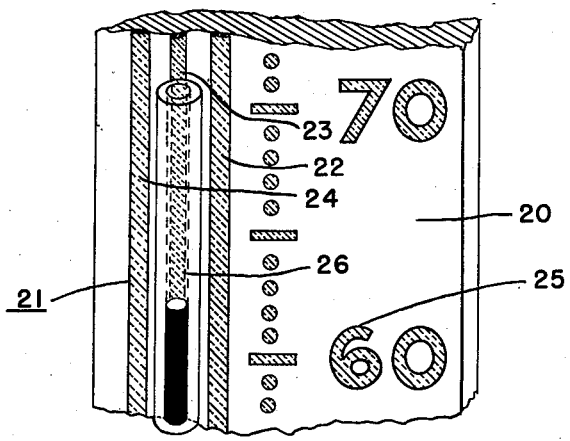
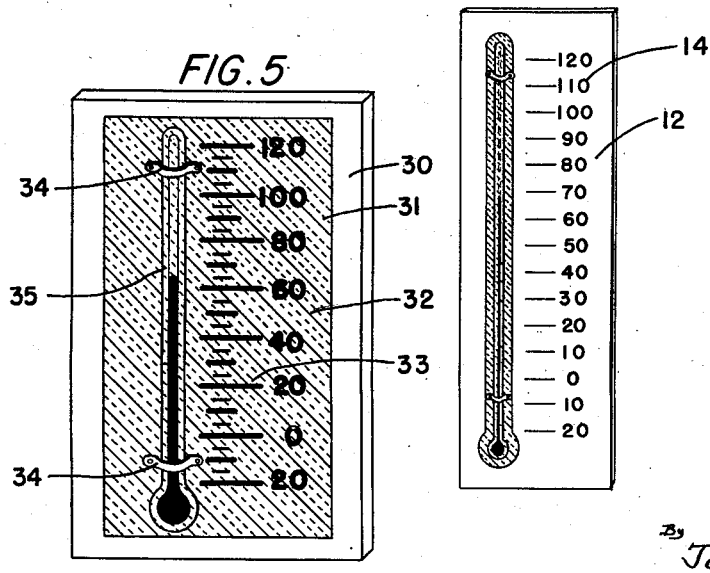
INVENTOR
MALVERN J. HILER
By Toulmin & Toulmin
ATTORNEYS Patented Jan. 19, 1954

2,666,329

UNITED STATES PATENT OFFICE 2,666,329

THERMOMETER ASSEMBLY WITH LIMITED LUMINOUS BACKGROUND

Malvern J. Hiler, Dayton, Ohio, assignor to Commonwealth Engineering Company of Ohio, Dayton, Ohio, a corporation of Ohio Application May 4, 1950, Serial No. 160,068

2 Claims. (Cl. 73—376)

The instant invention relates to thermometers. More particularly, it relates to thermometers which may be read either in daylight or in the dark. Still more particularly, it relates to thermometer construction allowing reading in the dark irrespective of the type of fluid within the thermometer tube.

This is an advantage because, for example, in manufacturing plants and the like electric lights are not always positionable where they will illuminate a thermometer, or upon power failure no light may be available to determine the course of a reaction which cannot be stopped without the loss of an entire run of material.

It is an object of the present invention to overcome the disadvantages and limitations of the thermometer equipment currently in use.

It is also an object of this invention to provide a thermometer in which the position of the indicating column will always be observable in conjunction with a luminous background.

It is also an object of this invention to provide a thermometer which may have a luminous backing for the bulb and indicating column as a permanent part of the base or as a detachable section.

It is a further object of the present invention to provide a luminous base which will convert daylight thermometers to night reading thermometers.

Various other objects and advantages will be apparent to one skilled in the art as the following description proceeds.

Briefly, the invention comprises a base upon which is disposed a luminous area as background against which to observe the thermometer bulb and stem, particularly the stem.

The thermometer liquid holding unit is positioned in front of the luminous area so as to be silhouetted thereagainst.

The use to which the thermometer is to be put determines the type of base to which the luminous area is to be applied. Where a thermometer is to have the bulb portion deposited in a thermometer well, the luminous area will merely be on the face of a stiff cardboard or metal tab positioned behind and preferably attached to that portion of the thermometer stem protruding from the well.

This tab may also carry a printed replica of the thermometer scale in non-luminous paint surrounded by luminous paint or vice versa, under either circumstances of which the scale will be readable in the dark.

If the thermometer requires a support, the support may be of any suitable material, such as wood or metal, to which the thermometer is secured by suitable brackets, clasps and the like. The luminous area may be painted directly on the support or the support may have a cardboard or metal tab which carries the luminous area positioned between the support and the thermometer.

Where the thermometer currently in use is of a construction holding the thermometer spaced from the support the cardboard or metal tab may be insertable to convert these thermometers to night reading thermometers.

Luminous areas are preferably of a size to give a distinct rim of material outlining the thermometer, the area behind the thermometer being painted in configurations as will be shown hereinafter.

It has been discovered that the luminous area of these configurations make a clearly readable night thermometer. If the liquid in the clear thermometer stem is opaque and non-luminous it produces a dark column, obscuring the luminous area behind and showing a very definite end point at the meniscus in the capillary tube.

If the liquid is a transparent or translucent liquid of relatively light color the liquid acts as though it too were luminous but showing a very definite meniscus end point.

Under these circumstances the luminous backing is preferably a line of narrower width than the liquid, the line having non-luminous areas on each side thereof between it and any other luminous area such as an area outlining the thermometer.

Thus, when a luminous scale is positioned adjacent the thermometer stem, a thermometer is formed as clearly readable in dark recesses and at night as in the daylight.

Luminous areas may be created by depositing on the desired base a suitable paint, varnish, resin, gum, or similar vehicles having as pigment therein materials such as zinc sulfide, cadmium sulfide, phosphors such as strontium sulfide, magnesium sulfide, and the selenides of various metals and alkaline earths. Some of these by proper treatment can be made reactive in infra red or ultra violet lights.

The invention will be more readily understood from the following description taken in connection with the drawings of a preferred embodiment thereof in which:

Figure 1 is a perspective view of an assembled thermometer unit;

Figure 2 is an elevational view of a metal base luminous insert for thermometers having an opaque fluid;

Figure 3 is an enlarged fragmentary view of a portion of the thermometer of Figure 2;

Figure 4 is a fragmentary elevational view of a metal base luminous insert having spaced luminous background elements; and Figure 5 is an elevational view of a metal base having a non-luminous scale.

In the drawings, the numeral 10 indicates a support. Secured to the support 10 by suitable means 11, such as adhesive, screws, tacks, and the like, is a metal base 12.

Base 12 is of such dimensions as to provide a luminous area 13 behind the thermometer and luminous scale and numbers 14 to one side of the stem thereof, the area between the area 13 and the scale 14 being non-luminous.

Support 10 is adapted with brackets 15 extending forwardly from the face thereof which secure in position a clear glass thermometer 16 of the standard mercury filled type.

Figure 4 illustrates a thermometer having a transparent or translucent liquid in the thermometer bulb and capillary.

There is shown herein a fragment of a base 20 of such dimensions as to provide space for a background 21 which is made up of three spaced luminous elements, 22, 23 and 24, and a luminous scale and numbers 25, the area between elements 22 and 23 and between 23 and 24 and between 24 and the scale being non-luminous. Thus as shown in Figure 4 a luminous stripe 23 having a width not greater than that of the clear glass thermometer stem 26 is positioned directly behind the stem co-extending longitudinally therewith; the transparent liquid in the stem will have the meniscus thereof made visible by emission from the stripe 23; luminous stripe elements 22—24 spaced apart on said base on either side of said luminous stripe and spaced therefrom by non-luminous stripes of said base assist in delineation of the meniscus. It is immediately recognizable that such an arrangement is suitable for either a mercury filling of the glass stem as well as for the transparent liquid filling since with mercury the luminous stripe 23 alone will indicate the meniscus.

In Figure 5 there is illustrated non-luminous indicating means positioned against a solid luminous background. The numeral 30 indicates a support. Secured to support 30 is a base 31.

Base 31 is coated over its entire surface with luminous material 32. Superimposed on the luminous background is non-luminous scale and numbers 33.

Support 30 is adapted with brackets 34 which secure in position a clear glass thermometer 35 of the standard mercury filled type.

The unit illustrated in Figures 1, 2 and 3 has a wooden base to which is secured a tin sheet of dimensions ½ inch wide by 3 inches long. The tin sheet is painted with luminous composition.

I employ vehicles having typical formula as follows:

Lacquer vehicle:

| | Parts by weight |
|---|---|
| 1. Pyroxylin | 7 |
| Isobutyl phthalate | 3 |
| Butyl acetate | 10 |
| Ethyl acetate | 30 |
| Butanol | 10 |
| Ethanol | 35 |
| 2. Cellulose acetate | 150 |
| Glyceryl phthalate | 100 |
| Dichlorethylene | 600 |
| Methanol | 200 |
| Methylene glycol | 100 |
| Cellosolve acetate | 100 |

Varnish vehicle:

| | | |
|---|---|---|
| 3. Ester gum | lbs | 100 |
| China-wood oil | gal | 42 |
| Heat to 520° F. | | |

Varnish vehicle:

| | | |
|---|---|---|
| | | Parts by weight |
| Linseed oil | gal | 8 |
| VMP Naphtha | gal | 60 |

In making a luminous paint, the vehicle may be compounded as follows:

Luminous paint:

| | Parts by weight |
|---|---|
| 4. White— | |
| Luminous cadmium sulfide | 20 |
| Zinc oxide | 10 |
| Barium sulfate | 10 |
| Vehicle 1 | 30 |
| 5. Yellow— | |
| Luminous cadmium sulfide | 20 |
| Barium sulfate | 5 |
| Barium chromate | 4 |
| Vehicle 2 | 25 |
| 6. Green— | |
| Luminous cadmium sulfide | 20 |
| Barium sulfate | 5 |
| Ultramarine blue | 3 |
| Cobalt blue | 3 |
| Varnish Vehicle 3 | 30 |

It will be understood that this invention is susceptible to modification in order to adopt it to different usages and conditions and, accordingly, it is desired to comprehend such modifications within this invention as may fall within the scope of the appended claims.

I claim:

1. A thermometer assembly having temperature indicating indicia readable in the dark comprising: a flat non-luminous base, a clear glass thermometer stem carried by said base, said base having a luminous stripe thereon directly behind said stem, said stripe having a width not greater than the cross section of said stem and being longitudinally co-extensive therewith, a pair of spaced luminous stripe elements on said base on either side of said luminous stripe and spaced therefrom by non-luminous stripes of said base, a transparent liquid filling said thermometer stem, and luminous indicia and markings on a side of one of said stripe elements remote from said stem.

2. A thermometer assembly having temperature indicating indicia readable in the dark comprising: a flat non-luminous base, a clear glass thermometer stem carried by said base, a transparent liquid filling said thermometer stem, said base having a luminous area thereon directly behind said stem, said area having a width not greater than the cross-section of said stem and being longitudinally co-extensive therewith, a pair of spaced luminous stripe elements on said base on either side of said stem and spaced therefrom by non-luminous stripes of said base, and luminous indicia and markings on a side of one of said stripe elements remote from said stem.

MALVERN J. HILER.

References Cited in the file of this patent

UNITED STATES PATENTS

| Number | Name | Date |
|---|---|---|
| 165,816 | Gano | July 2, 1875 |
| 360,038 | Myers | Mar. 29, 1887 |
| 1,338,524 | Pitkin | Apr. 27, 1920 |
| 1,363,803 | Milker et al. | Dec. 29, 1920 |
| 1,626,790 | Curran | May 3, 1927 |

FOREIGN PATENTS

| Number | Country | Date |
|---|---|---|
| 7,513 1915 | Great Britain | Mar. 6, 1919 |